United States Patent [19]
Khalifa et al.

[11] Patent Number: 5,743,151
[45] Date of Patent: Apr. 28, 1998

[54] LOCKING MECHANISM FOR TILT STEERING COLUMN

[75] Inventors: Mustafa A. Khalifa, Dearborn; Kenneth Budowick, Lapeer; Lawrence C. Kosinski, Warren; John A. Cole, Sterling Heights, all of Mich.

[73] Assignee: Chrysler Corporation, Auburn Hills, Mich.

[21] Appl. No.: 695,459

[22] Filed: Aug. 12, 1996

[51] Int. Cl.$^6$ .................... B62D 1/18; F16C 11/10
[52] U.S. Cl. .................. 74/493; 280/775; 403/84; 403/92
[58] Field of Search ............... 74/493; 280/775; 403/84, 91, 92, 94

[56] References Cited

U.S. PATENT DOCUMENTS 3,167,971 2/1965 Zeigler et al. ................ 74/493
5,426,994 6/1995 Khalifa et al. ................ 74/493

*Primary Examiner*—Rodney H. Bonck
*Assistant Examiner*—Ankur Parekh
*Attorney, Agent, or Firm*—Lawrence J. Shurupoff

[57] ABSTRACT

Apparatus for releasably locking a tilt steering wheel assembly in adjusted position comprises a bracket having a pair of spaced-apart plates affixed to the jacket of the steering shaft, and a pawl between the plates pivoted to the steering wheel assembly. Each plate has a hole and the holes are aligned. The pawl has a series of spaced holes. The pawl has a cam track. A cam on the bracket is engageable with the cam track to cause the pawl holes to align successively with the bracket holes when the steering wheel assembly is pivoted to various different positions. A lock pin is engageable in the aligned bracket and pawl holes to lock the steering wheel assembly in a desired position of adjustment.

7 Claims, 3 Drawing Sheets

LOCKING MECHANISM FOR TILT STEERING COLUMN

FIELD OF INVENTION

This invention relates generally to steering columns for automotive vehicles, and more particularly to a locking mechanism for a tilt steering column.

BACKGROUND AND SUMMARY OF THE INVENTION

A tilt steering column allows an operator of a vehicle to adjust the height and angle of the steering wheel depending on the operator's stature, seat position, and comfort. Typically, the steering wheel can also be placed in an uppermost position to allow the operator to get in and out of the driver's seat more easily.

On some steering columns now in use, the locking mechanism is not positive and sometimes releases in response to a frontal impact. When this happens, the tilt mechanism may allow the steering wheel to move to its uppermost position due to the large return spring provided for this purpose. When in its uppermost position, the steering wheel is in an unfavorable position with respect to the driver in the event that the air bag deploys.

The locking mechanism of the present invention is positive in its operation and not subject to release in the event of a frontal impact. More particularly, the locking mechanism has a bracket mounted on a fixed part of the vehicle, and a pawl pivoted to the tiltable steering wheel assembly provided with a plurality of apertures selectively alignable with a hole in the bracket to receive a lock pin to positively secure the steering wheel assembly in adjusted position. A cam engageable with a cam track on the pawl guides the pawl to positions such that each of the apertures is automatically alignable with the hole in the bracket.

In a preferred embodiment of the invention, the cam is in the form of a pin which is connected to and parallel with the lock pin so that the two move together. A coil spring on the cam pin urges both pins to a position in which the lock pin extends through the hole in the bracket and through an aligned aperture in the pawl. Preferably, also, a spring is provided to urge the pawl in a direction causing the cam track to engage the cam pin.

One object of this invention is to provide a locking mechanism for a tilt steering column having the foregoing features and capabilities.

Another object is to provide a locking mechanism for a tilt steering column which is composed of a relatively few simple parts, is rugged and durable in use, and can be readily and inexpensively manufactured and assembled.

Other objects, features and advantages of the invention will become more apparent as the following description proceeds, especially when considered with the accompanying drawings.

DETAILED DESCRIPTION OF THE PREFERRED EMBODIMENT

Figure 1:
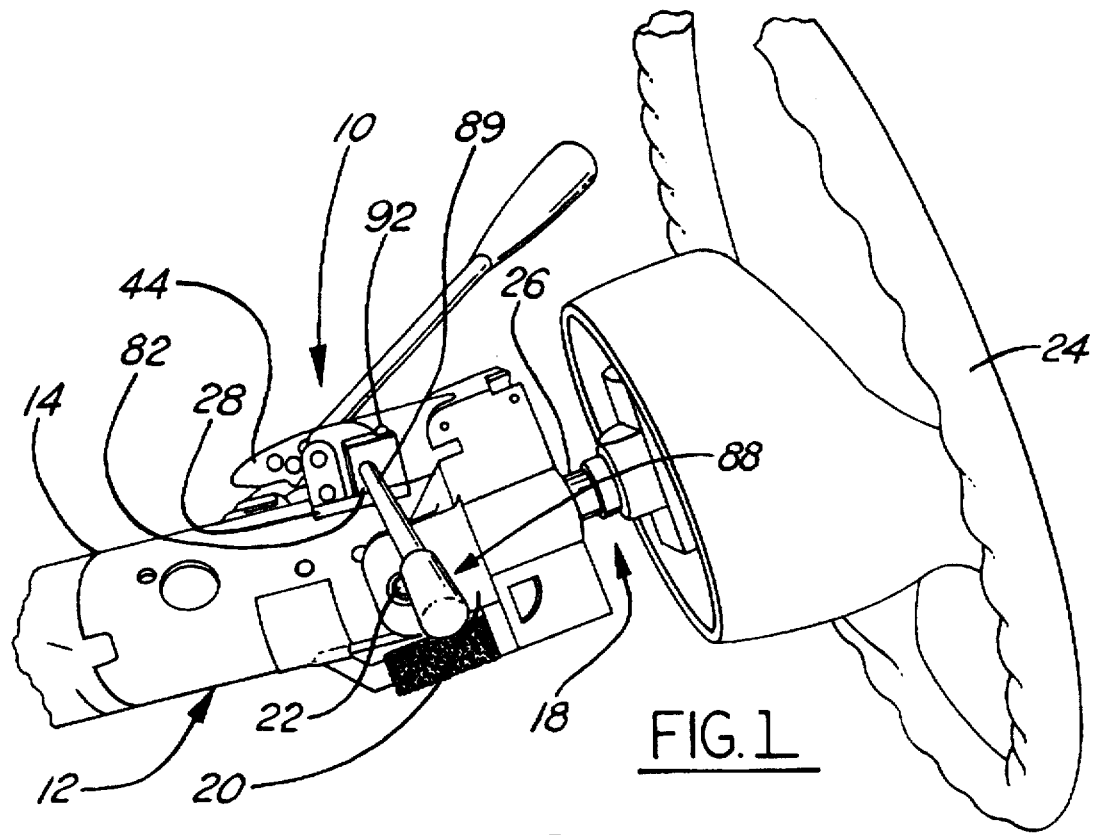
FIG. 1 is a fragmentary perspective view of a tilt steering column as seen from the side, having a locking mechanism constructed in accordance with the invention.
Figure 2:
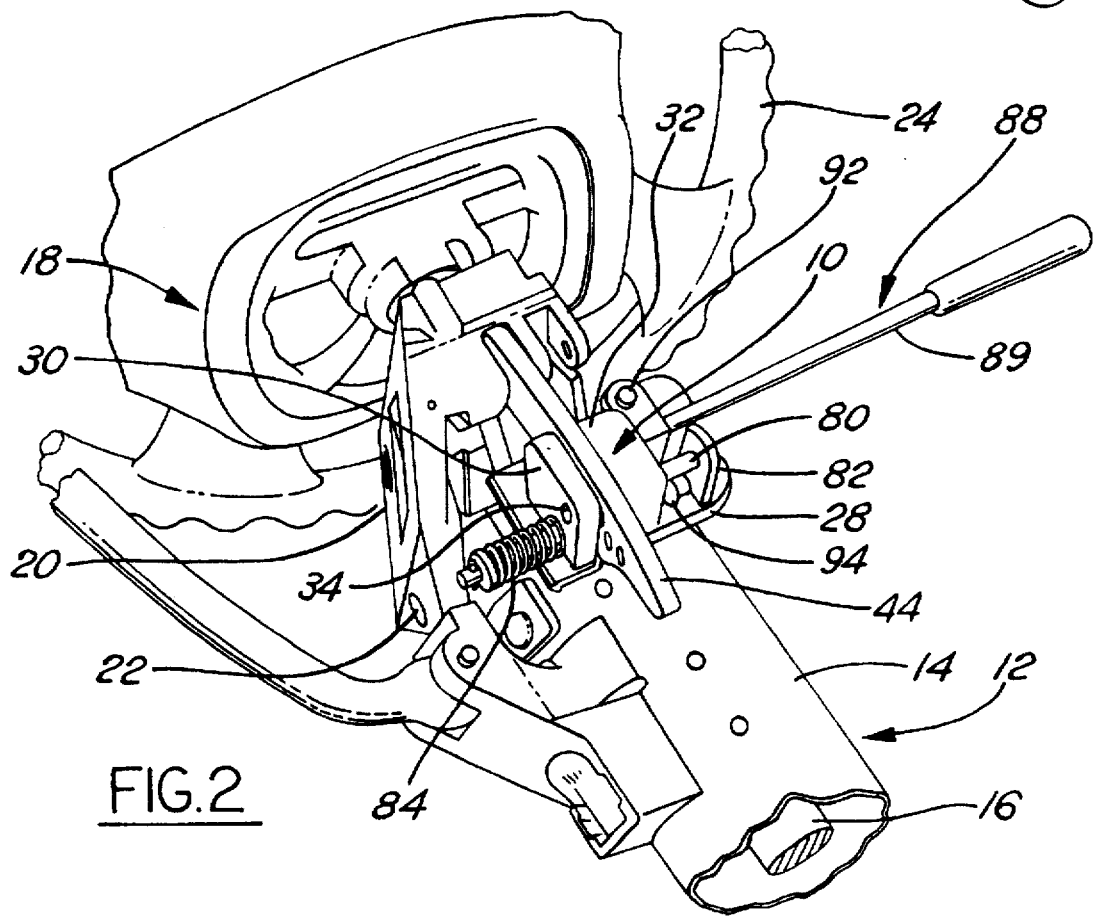
FIG. 2 is a perspective view of the structure of FIG. 1 as seen from above.
Figure 3:
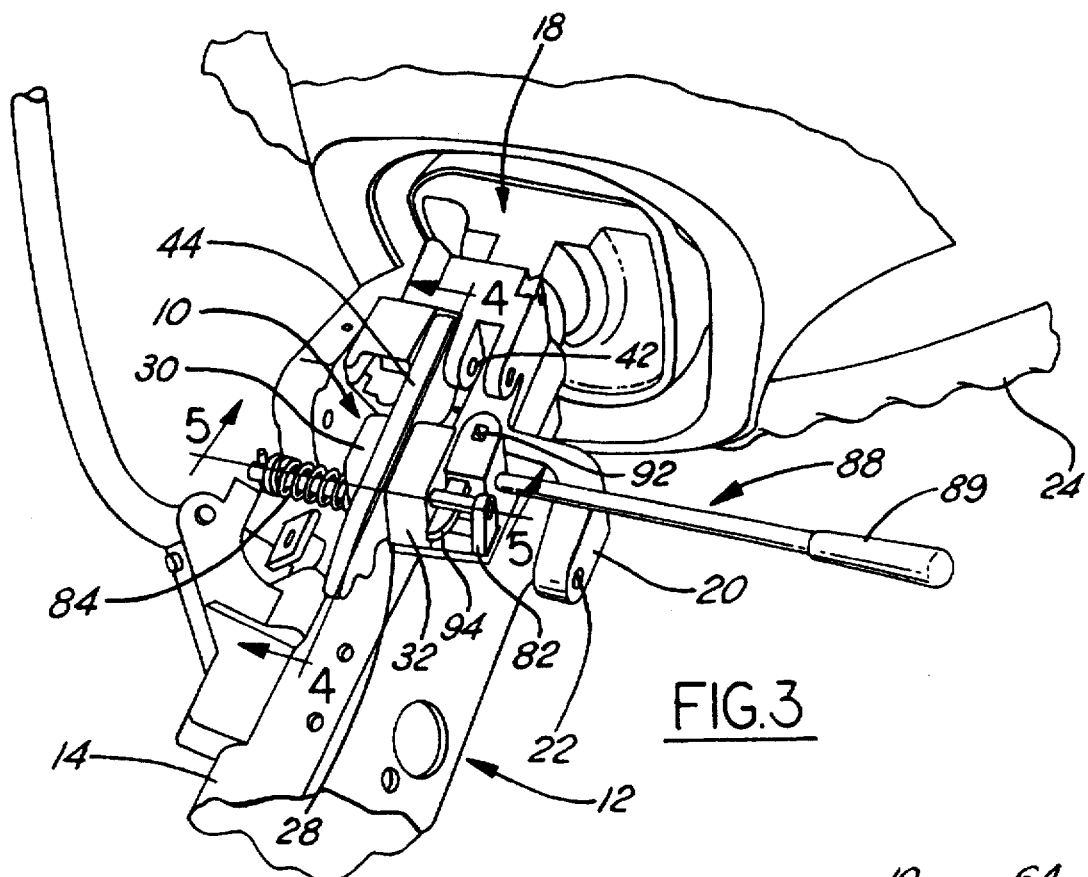
FIG. 3 is a perspective view similar to FIG. 2 but as seen from a different angle.

Referring now more particularly to the drawings, and especially to FIGS. 1–3, a tilt lock mechanism 10, constructed in accordance with the invention, is shown in operative relationship with a steering column 12 of an automotive vehicle. The steering column 12 extends upwardly and rearwardly and includes an elongated rigid sleeve or jacket 14 affixed to the vehicle frame and an elongated steering shaft 16 which extends lengthwise through the jacket. The lower end of the steering shaft is connected by a suitable coupler of known construction to a steering gear assembly (not shown) for steering the wheels of the vehicle.

A steering wheel assembly 18 at the upper end of the steering column has a mounting bracket 20 and the mounting bracket is pivoted to the jacket 14 by aligned horizontal pivot pins 22 to permit up and down pivotal movement of the steering wheel assembly 18. The steering wheel assembly has a steering wheel 24 provided with a steering wheel shaft 26 coupled to the steering shaft 16 by a coupler (not shown). It will be appreciated that the coupler is conventional and known in the art to allow the steering wheel shaft 26 to pivot or rotate relative to the steering shaft 16 so that the steering wheel 24 and the entire steering wheel assembly 18 may be tilted or adjusted up and down as desired.

The tilt lock mechanism 10 comprises a bracket 28 rigidly secured as by welding to the jacket 14 of the steering column. The bracket 28 has a pair of laterally spaced-apart parallel upstanding plates 30 and 32. Plates 30 and 32 are in planes which are parallel to the longitudinal axis of the steering column. The respective plates 30 and 32 have transversely aligned circular holes or apertures 34 and 36 of equal diameter, the common axis of which is perpendicular to the steering column. The plates 30 and 32 also have transversely aligned circular holes 38 and 40 of equal diameter, the common axis of which is parallel to the common axis of the holes 34 and 36.

Pivoted to the mounting bracket 20 of the steering wheel assembly 18 by a pivot pin 42 is an elongated pawl 44. The pawl extends forwardly from pivot pin 42 generally parallel to the steering column 12 and is slidably disposed between the bracket plates 30 and 32. The pawl has a series of longitudinally spaced-apart circular holes or apertures 46, 48, 50, 52 and 54 which are the same diameter as the holes 34 and 36. Three of these holes, namely, the holes 46, 48 and 50, are located in an arc close to the upper edge of the pawl. The hole 52 is between and slightly below the arc of the holes 46 and 48 and the hole 54 is between and slightly below the arc of the holes 48 and 50. The holes 46–54 are provided for selective alignment with the bracket holes 34 and 36, depending upon the tilt of the steering wheel assembly.

The bottom surface of the pawl 44 serves as a cam track 60. An elongated cam pin 62 of circular cross-section is provided for cooperative engagement with the cam track. The cam pin 62 is of substantially the same diameter as holes 38 and 40 and is axially slidably received therein.

Figure 4:
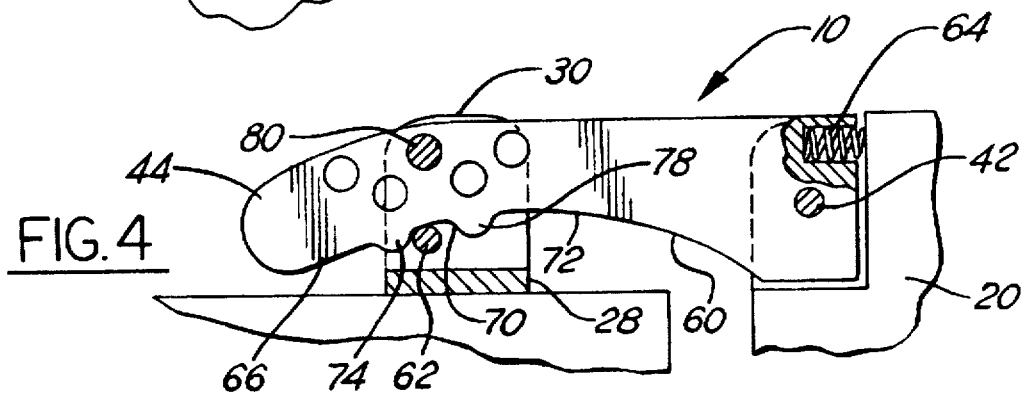
FIG. 4 is a sectional view taken on the line 4—4 in FIG. 3.
Figure 7:
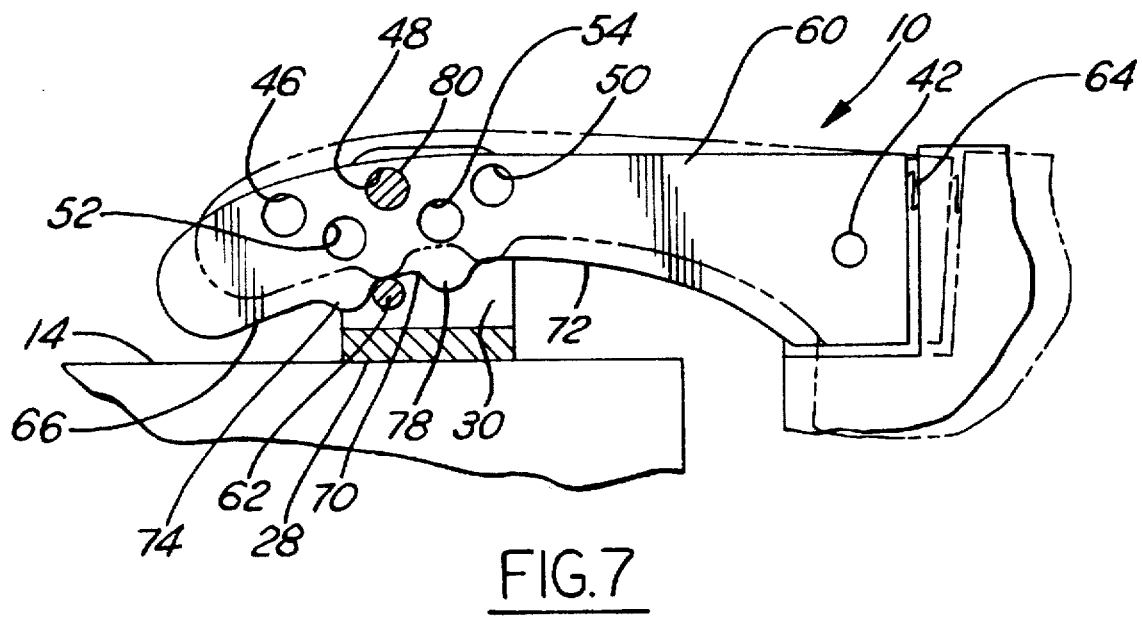
FIG. 7 is a view similar to FIG. 4, but showing the pawl of the locking mechanism in different positions.

A compression coil spring 64 disposed in a recess in the forward or pivoted end of the pawl 44 engages the mounting bracket 20 to urge the pawl counterclockwise in FIGS. 4 and 7 to hold the pawl 44 in engagement with the cam pin 62. The cam pin 62, by engagement with the cam track, guides the pawl to positions such that the apertures 46–54 are automatically and successively aligned with the holes 34 and 36 of the bracket plates as the steering wheel assembly is adjusted up and down.

The cam track 60 is such that the surface portion 66 thereof will engage the cam pin 62 when the pawl hole 46 is aligned with the bracket holes 34 and 36. The surface portion 70 of the cam track 60 engages the cam pin 62 when the pawl hole 48 is aligned with the bracket holes 34 and 36. The surface portion 72 of the cam track 60 engages the cam pin 62 when the pawl hole 50 is aligned with the bracket holes 34 and 36. A projection 74 on the cam track 60 engages the cam pin 62 when the hole 52 is aligned with the bracket holes 34 and 36, and a projection 78 on the cam track 60 engages the cam pin 62 when the pawl hole 54 aligns with the bracket holes 34 and 36. Thus, it will be seen that the cam track is designed to automatically align the respective pawl holes 46–54 with the bracket holes 34 and 36 in the selected positions of adjustment provided by this tilt lock mechanism.

An elongated lock pin 80 is provided for locking the pawl in adjusted position with respect to the bracket. The lock pin 80 is substantially the same diameter as the holes 48–54 in the pawl and the holes 34 and 36 in the plates 30 and 32 so that the lock pin will have a close sliding fit therein.

Figure 5:
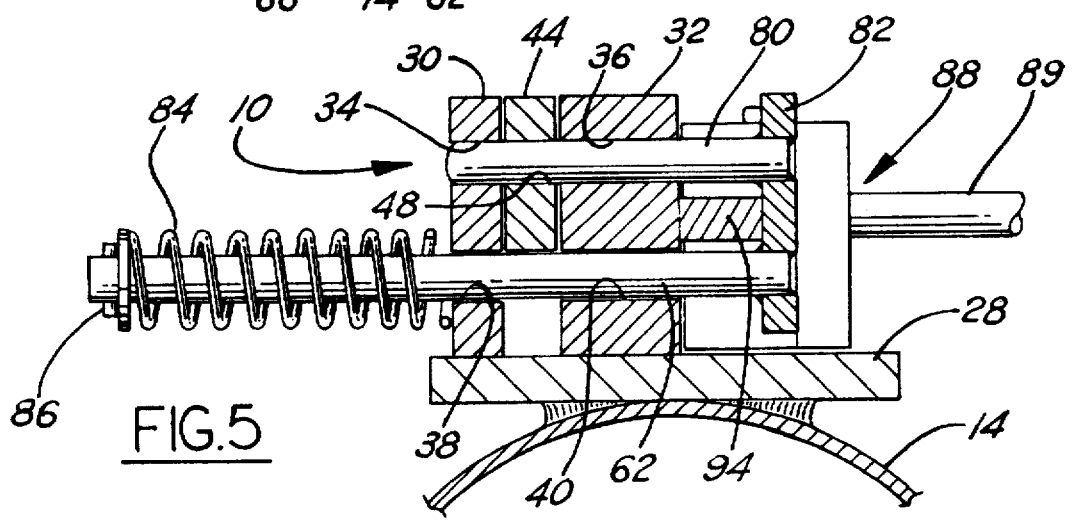
FIG. 5 is a sectional view taken on the line 5—5 in FIG. 3.

The lock pin 80 is parallel to the cam pin 62 and is rigidly connected thereto by a base plate 82. A coil spring 84 encircles the cam pin 62 and is compressed between a stop 86 on the cam pin and the plate 30. The spring 84 normally urges the cam pin 62 to the left in FIGS. 5 and 6, at the same time urging the lock pin 80 to its extended position extending through one of the holes 46–54 in the pawl 44 and the aligned holes 34 and 36 in the bracket plates 30 and 32.

Figure 6:
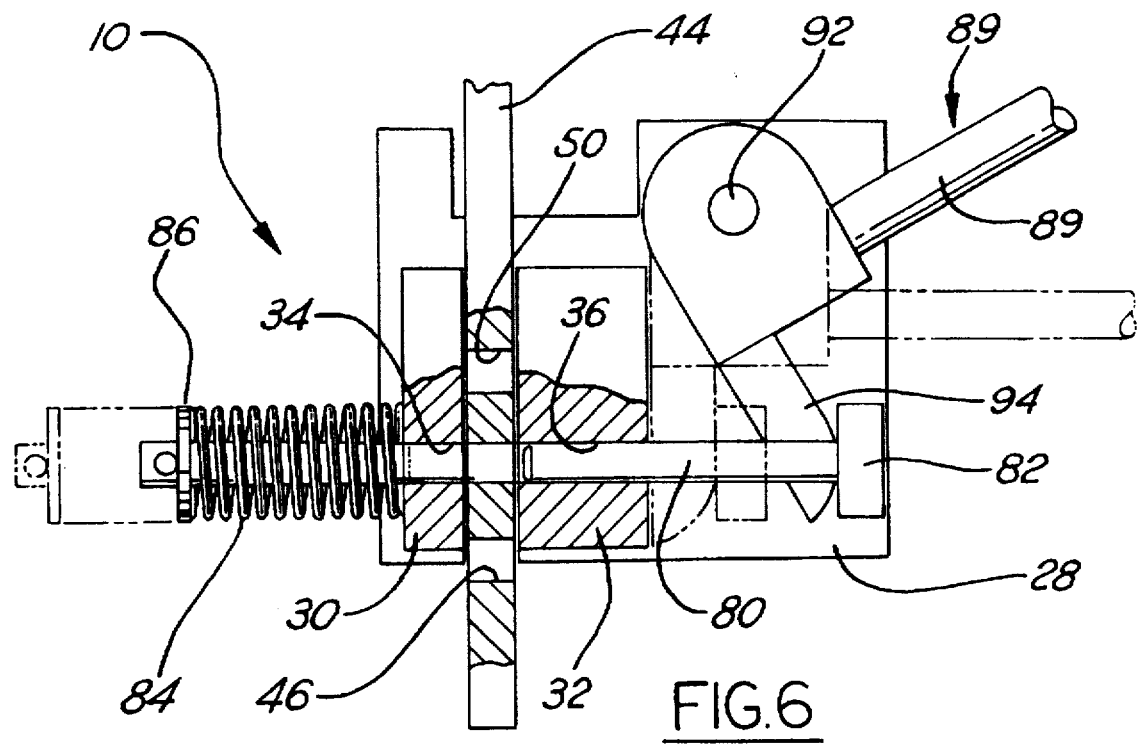
FIG. 6 is a view partly in elevation and partly in section of the structure in FIG. 5 as seen from above, showing the lock pin retracted in solid lines and extended in broken lines.

An actuator 88 is provided for retracting the lock pin 80 and cam pin 62 to the position shown in solid lines in FIG. 6. The actuator is in the form of a handle 89 pivoted to the mounting bracket 20 by a pin 92, having a lever arm 94 engageable with the base plate 82 so that when the handle is turned counterclockwise in FIG. 6, the lever arm 94 engages the base plate and retracts the lock pin 80 against the force of spring 84.

In operation, when it is desired to change the position of the tilt steering wheel, the handle 89 is manipulated to retract the lock pin 80 as shown in FIG. 6 to a position in which the lock pin is withdrawn to the right far enough to clear the pawl 44. Then the steering wheel assembly may be tilted to a new position in which another one of the pawl holes 46–54 becomes aligned with the bracket holes 34–36. Then when the lever is released, the lock pin 80 will extend through the pawl hole as in FIG. 5 and through both holes 34 and 36 of plates 30 and 32 to positively secure the adjustment of the steering wheel. The handle may simply be released during adjustment at the point where the desired steering wheel position is reached, and then by further slight movement of the steering wheel the lock pin will pop through an aligned hole in the pawl. The cam track along the lower edge of the pawl ensures that the pawl is elevated to the proper level for engagement with each of the pawl holes.

What is claimed is:

1. Apparatus for releasably locking a tilt steering wheel assembly of an automotive vehicle in adjusted position, comprising support structure affixed to the vehicle frame, means pivotally mounting the steering wheel assembly on said support structure for vertical pivotal movement, means for releasably locking said steering wheel assembly in a desired position of adjustment comprising a bracket affixed to said support structure and having a bracket hole therein, an elongated pawl pivoted to said steering wheel assembly and extending across said bracket, said pawl having a series of spaced apart pawl holes, said pawl having a cam track extending generally lengthwise thereof, a cam on said bracket engageable with said cam track to cause said pawl holes to align successively with said bracket hole when said steering wheel assembly is pivoted to various different positions, a lock pin axially movable to an advanced position engaging said bracket hole and a pawl hole aligned therewith to lock said steering wheel assembly in a desired position of pivotal adjustment, wherein said cam is a pin extending slidably through a hole in said bracket, said cam pin being parallel to said lock pin, and means connecting said lock pin and cam pin together.

2. Apparatus as defined in claim 1, and further including an actuator for axially moving said lock pin.

3. Apparatus as defined in claim 1, and further including spring means pressing on said pawl to hold said cam track against said cam pin.

4. Apparatus as defined in claim 1, and further including spring means for urging said lock pin to said advanced position.

5. Apparatus for releasably locking a tilt steering wheel assembly of an automotive vehicle in adjusted position, comprising support structure affixed to the vehicle frame, means pivotally mounting the steering wheel assembly on said support structure for vertical pivotal movement, means for releasably locking said steering wheel assembly in a desired position of adjustment comprising a bracket affixed to said support structure, said bracket comprising a pair of laterally spaced-apart, parallel plates having aligned holes therein, an elongated pawl pivoted to said steering wheel assembly and extending between said plates, said pawl having a series of spaced apart pawl holes, said pawl having a cam track extending generally lengthwise thereof, a cam on said bracket engageable with said cam track to cause said pawl holes to align successively with said plate holes when said steering wheel assembly is pivoted to various different positions, a lock pin axially movable to an advanced position engaging said plate holes and a pawl hole aligned therewith to lock said steering wheel assembly in a desired position of pivotal adjustment, an actuator for axially moving said lock pin, spring means for urging said lock pin to said advanced position, wherein said cam is a cam pin extending slidably through aligned holes in said plates, said cam pin is parallel to and connected to said lock pin, and said spring means urging said lock pin to said advanced position is a coil spring encircling and acting on said cam pin.

6. Apparatus as defined in claim 5, and further including second spring means pressing on said pawl to hold said cam track against said cam pin.

7. Apparatus for releasably locking a tilt steering wheel assembly of an automotive vehicle in adjusted position, comprising support structure affixed to the vehicle frame, means pivotally mounting the steering wheel assembly on said support structure for vertical pivotal movement, means for releasably locking said steering wheel assembly in a desired position of adjustment comprising a bracket affixed to said support structure and having a bracket hole therein, an elongated pawl pivoted to said steering wheel assembly and extending across said bracket, said pawl having a series of spaced apart pawl holes, said pawl having a cam track extending generally lengthwise thereof, a cam engageable with said cam track to cause said pawl holes to align successively with said bracket hole when said steering wheel assembly is pivoted to various different positions, a lock pin axially movable to an advanced position engaging said bracket hole and a pawl hole aligned therewith to lock said steering wheel assembly in a desired position of pivotal adjustment, said cam comprising a cam pin extending parallel to said lock pin, means supporting said cam pin for axial sliding movement, and means connecting said lock pin and said cam pin together.

* * * * *